United States Patent [19]

Anderegg

[11] Patent Number: 5,365,662
[45] Date of Patent: Nov. 22, 1994

[54] METHOD FOR MANUFACTURING AN INTERNAL STRUCTURE FOR INTEGRAL RAILWAY COACH BODIES

[75] Inventor: Kurt Anderegg, Rheineck, Switzerland

[73] Assignee: Inventio AG, Hergiswil, Switzerland

[21] Appl. No.: 89,720

[22] Filed: Jul. 12, 1993

[30] Foreign Application Priority Data

Jul. 10, 1992 [CH] Switzerland ............ 02180/92-4

[51] Int. Cl.⁵ .................................. B61D 17/00
[52] U.S. Cl. ............................. 29/897.2; 29/450; 29/455.1; 242/7.21
[58] Field of Search .............. 29/897.2, 450, 451, 29/455.1, 234, 238; 296/178; 242/7.21, 7.22; 105/1.4, 329.1, 397

[56] References Cited

U.S. PATENT DOCUMENTS

| | | | |
|---|---|---|---|
| 2,288,340 | 6/1942 | Yates | 29/455.1 |
| 3,653,333 | 4/1972 | Taylor | 29/455.1 |
| 4,780,947 | 11/1988 | Palazzo | 29/455.1 |

FOREIGN PATENT DOCUMENTS 0024157  2/1981  European Pat. Off. .
0043106  1/1982  European Pat. Off. .
0489294  6/1992  European Pat. Off. .
1490575 11/1977  United Kingdom .

*Primary Examiner*—Mark Rosenbaum
*Assistant Examiner*—David P. Bryant
*Attorney, Agent, or Firm*—Howard & Howard

[57] ABSTRACT

A method for manufacturing an internal structure of a coach body having a self-supporting outer structure includes winding an inner covering layer on a winding core, attaching channel segments to a ceiling wall and insulation segments to corner regions, attaching heating fabric sheets to a floor wall and to side walls, attaching metal rails extending longitudinally to the floor wall and the side walls, filling between the rails with insulating foam, winding an outer covering layer to form an internal structure. After the setting of the resin impregnated layers, the internal structure is removed from the winding core and cut open longitudinally at the floor wall. The internal structure is elastically deformed and inserted into an outer structure. The walls of the internal structure are moved by a tensioning device into engagement with the outer structure and the internal structure is provisionally attached to the outer structure with fasteners.

12 Claims, 5 Drawing Sheets

METHOD FOR MANUFACTURING AN INTERNAL STRUCTURE FOR INTEGRAL RAILWAY COACH BODIES

BACKGROUND OF THE INVENTION

The present invention relates generally to a method for the manufacture of large integral bodies and, in particular, to a method of manufacturing railway coach bodies.

There is shown in the British patent specification GB 1 490 575 a coach body, which is manufactured by a winding method and which comprises an inner winding layer, a stiffening framework, insulation positioned between an inner winding layer and an outer winding layer. Recesses for the reception of ventilation, heating, electrical, illumination and sanitary devices are provided between the inner and the outer winding layer. The inner winding layer, the stiffening framework, the insulation and the outer winding layer form a self-supporting coach body.

A disadvantage of the known coach bodies is that the inner winding layer which serves as an internal structure is non-detachably connected with the stiffening framework. A further disadvantage of the known coach bodies is that the stiffening framework must be solidly attached free of play to the resin impregnated fiber compound materials of the inner winding layer, which is manageable only with a lengthy and expensive assembly.

SUMMARY OF THE INVENTION

The present invention concerns a method for the manufacture of integral coach bodies. In a first step, an inner covering layer is wound on a winding core to form an internal structure, the winding core having a desired size and shape of a coach body, the inner covering layer having a generally rectangular cross section with a ceiling wall, a floor wall and a pair of spaced apart side walls connected by four curved corner regions. In a second step, at least one channel segment is attached to an outer surface of the ceiling wall, insulation segments are attached to outer surfaces of the corner regions, heating fabric sheets are attached to outer surfaces of the floor wall and the side walls for heating the floor wall and the side walls, and a plurality of spaced apart longitudinally extending metal rails are attached to outer surfaces of the floor wall and the side walls. In a third step, depressions between the metal rails are filled with insulating foam. In a fourth step, an outer covering layer is wound about the internal structure. In a fifth step, the internal structure is removed from the winding core.

In a sixth step, apertures are formed in the ceiling wall and the side walls and the floor wall is cut open longitudinally. In a seventh step, the internal structure is elastically and inserted into an outer structure. In an eighth step, the floor wall, the side walls and the ceiling wall of the internal structure are moved outwardly into engagement with the outer structure and the internal structure is attached to the outer structure to form a partial coach body. A plurality of longitudinally extending elastic bands can be inserted between the ceiling wall of the internal structure and the outer structure before the walls are moved. In addition, the internal structure can be formed as a plurality of portions which are inserted one after the other into the outer structure and attached thereto.

The method according to the present invention solves the prior art problem by manufacturing a complete internal structure which is independent of the carrying structure of the coach body.

The advantages achieved by the present invention are substantial in that a significant reduction in weight and costs is possible by the automated method of manufacturing the complete internal structure.

A further advantage of the present invention is that the internal structure, which can be standard, can be inserted into coach bodies with different supporting structures which in turn enables production at high output rates.

A further advantage is that no connections, which are difficult to separate, are made between different materials such that the requirements for waste friendly to the environment can thereby be taken into account.

A further advantage is that a complete replacement of the internal structure is possible at a reasonable cost during the service life of a coach body.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
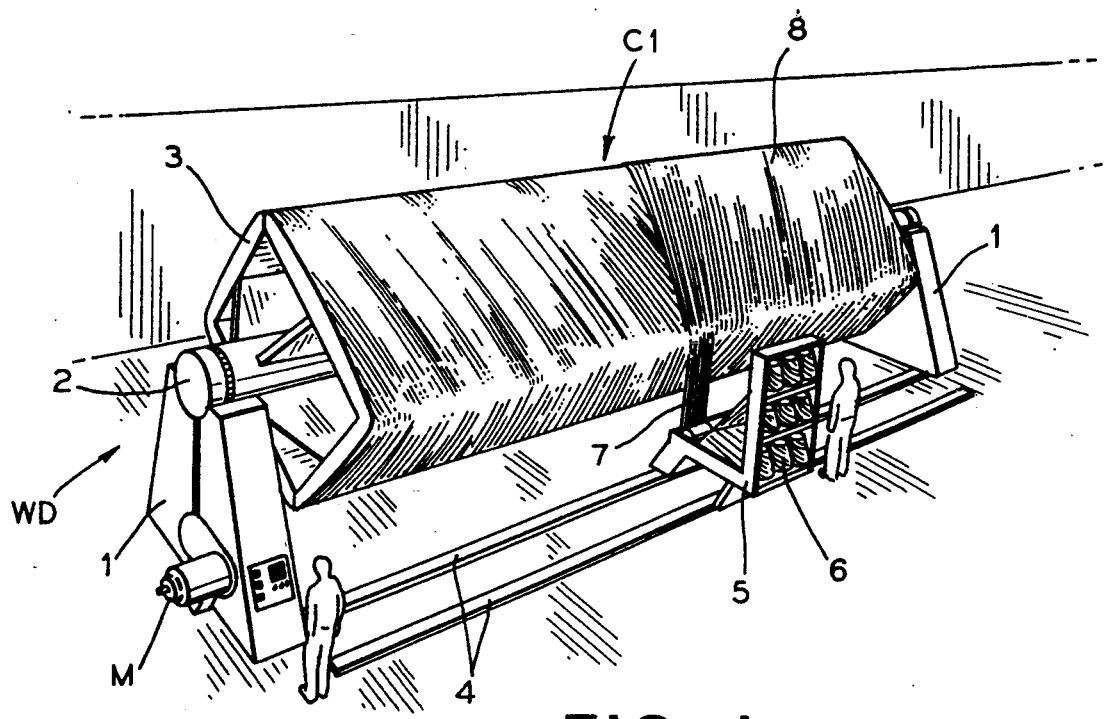
FIG. 1 is a perspective view of a winding device for large structures on which an inner covering layer for a coach body is being wound in accordance with the method of the present invention.

There is shown in the FIG. 1, a winding device WD for the performance of the method according to the present invention. The device WD includes a pair of spaced apart fixed winding blocks 1 which support opposite ends of a mandrel 2. The mandrel 2 is driven in rotation by a drive means such as an electric motor M mounted on one of the winding blocks 1. A winding core 3 is mounted on the mandrel 2 and is formed with a size and shape corresponding to a desired a body to be manufactured such as a railway coach body having a generally rectangular tubular cross section with generally planar walls connected by curved corner regions. A winding material 6 is in the form of a plurality of spools of fibers and/or rolls of fabric. The fibers and fabric are made from glass fibers, carbon fibers or natural fibers which are guided together into a strand 7 and impregnated by a resin material. The winding material 6 is mounted on a material carrier 5 which moves on a pair of rails 4 extending generally parallel to a longitudinal axis of the mandrel 2. In order to manufacture an inner covering layer 8, as well as additional outer layer (not shown), the strand 7 is wound onto the winding mandrel 3, which mandrel rotates about its longitudinal axis, in a spiral pattern in two or more mutually crossing alternating direction layers to form an internal structure C1 in a first step.

Figure 2:
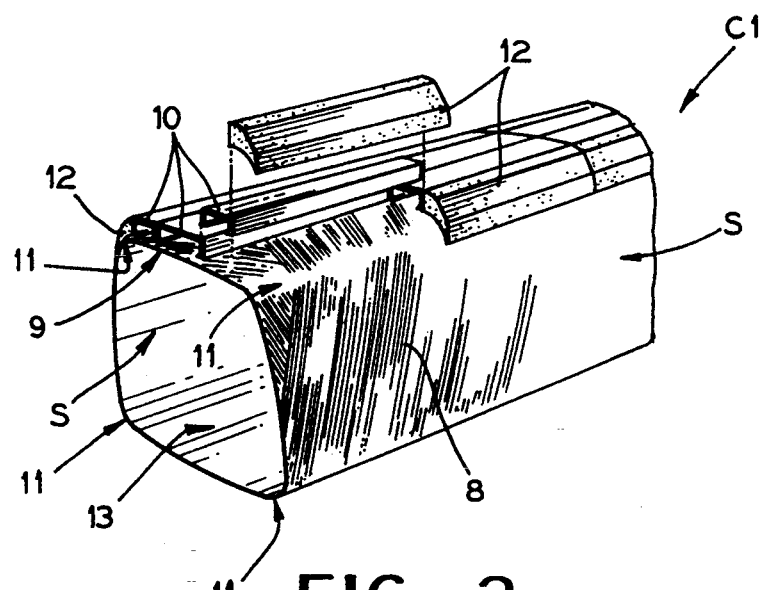
FIG. 2 is a fragmentary perspective view of the coach body shown in the FIG. 1 with channel segments and insulation segments attached to the inner covering layer in accordance with the method of the present invention.

As shown in the FIG. 2, the inner covering layer 8, which is formed on and carried by the winding mandrel 3, has attached to an outer surface thereof a plurality of generally U-shaped channel segments 10 for the location of devices which introduce and remove air, illuminate and perform other functions. The channel segments 10 are attached to the outer surface of the inner layer 8 in an area of a ceiling wall 9. Also attached to the outer surface of the inner layer 8 in four corner regions 11 are shape-determining insulation segments 12. The channels 10 and the insulation segments 12 can be attached by any suitable means such as an adhesive in a second step. The ceiling wall 9, a floor wall 13 and a pair of side walls S extend between the corner regions 11 and form a generally tubular body. As defined by the winding core 3, the ceiling wall 9, the channels 10, the floor wall 13 and the side walls S are generally planar and the corner regions 11 and the insulation segments 12 are generally curved in profile for ease of winding.

Figure 4:
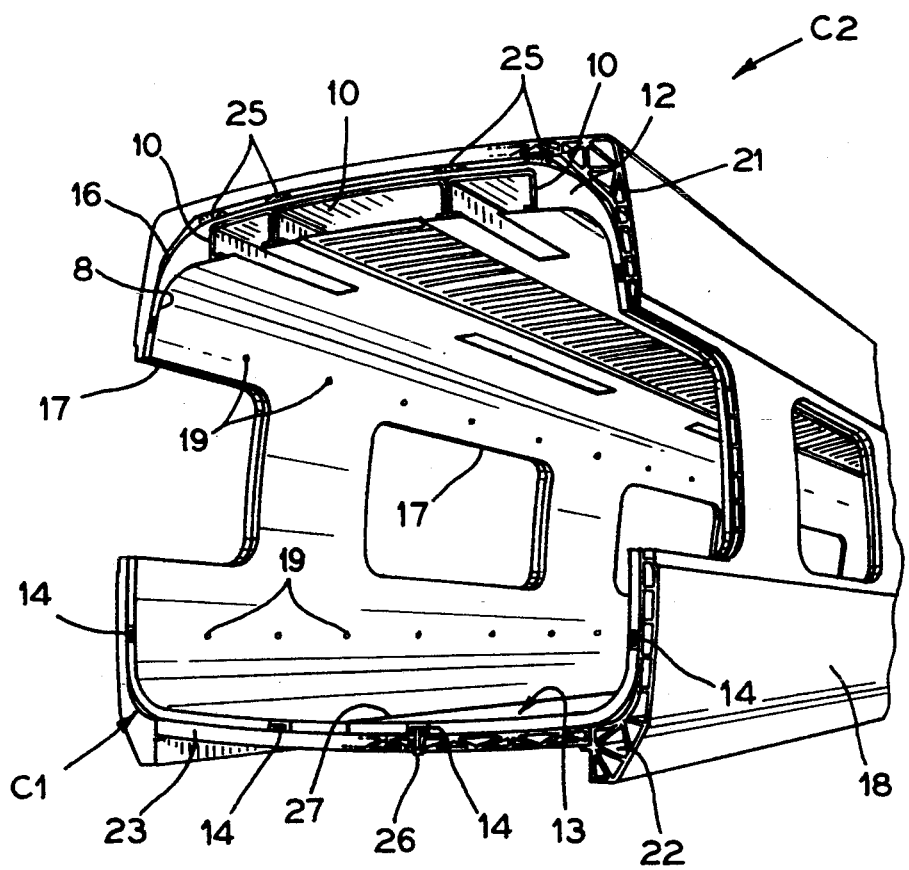
FIG. 4 is a fragmentary perspective view similar to the FIG. 3 showing internal structure and the outer structure assembled in accordance with the method of the present invention.

As best seen in the FIG. 4, a plurality of generally longitudinally extending metal rails 14 are located at spaced apart positions and attached to the outer surface of the inner layer 8 in the region of the floor wall 13 and in region of the side walls S. Positioned between the rails 14 are a plurality of heating fabric sheets 30 which serve as floor heating and wall heating sources and are illustrated in detail in the FIG. 5. The second step is now complete and the internal structure C1 is ready for additional steps to be performed.

Figure 5:
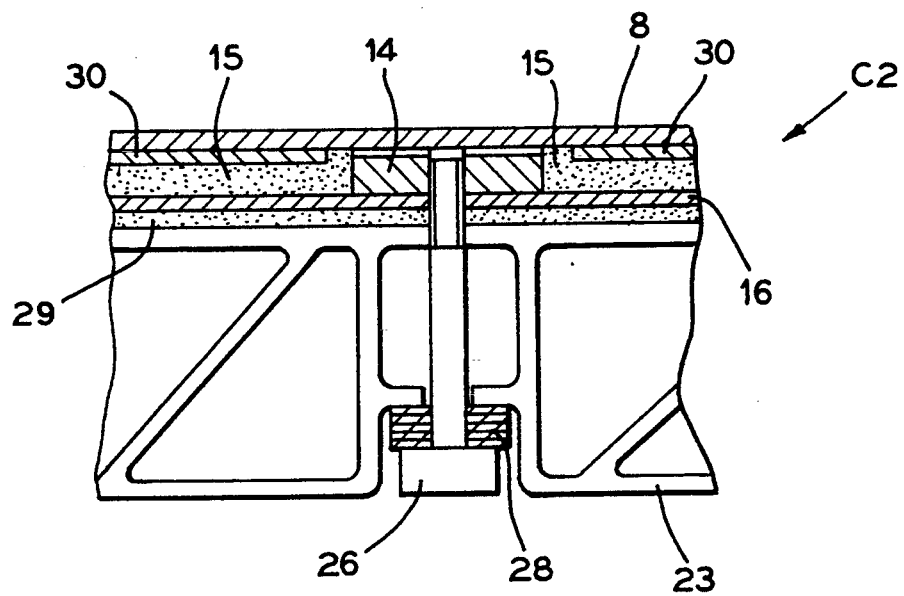
FIG. 5 is an enlarged fragmentary cross-sectional view showing the attachment of the internal structure to the outer structure in accordance with the method of present invention.

The unevenness or depressions caused by the difference in thicknesses of and the gaps between the rails 14 and the sheets 30 at the outer surface of the inner layer 8 is levelled out by filling with an insulating foam 15 as shown in the FIG. 5 to complete a third step. The foam produces a stepless outer surface which can be wound over with an outer covering layer 16, as shown in the FIG. 5, similar to the inner covering layer 8. The outer covering layer 16 is applied in a fourth step.

After the setting of the resin-impregnated covering layers 8 and 16, the internal structure C1 is removed from the winding core 3 in a fifth step. Apertures B (FIG. 3) for the feed and removal of air as well as for illumination devices are then formed in the ceiling wall 9. As shown in the FIG. 4, a plurality of window openings 17 are formed in the side walls S either before or after the installation of the internal structure C1 into a generally tubular outer structure 18. A plurality of apertures 19 are formed in the side walls S at a luggage rack height and at a seating height. As shown in the FIG. 3, a generally longitudinal cut 20 is made in the floor wall 13 to complete a sixth step. The cut 20 enables an elastic deformation of the internal structure C1 which permits assembly with the outer structure 18 as explained below.

Figure 3:
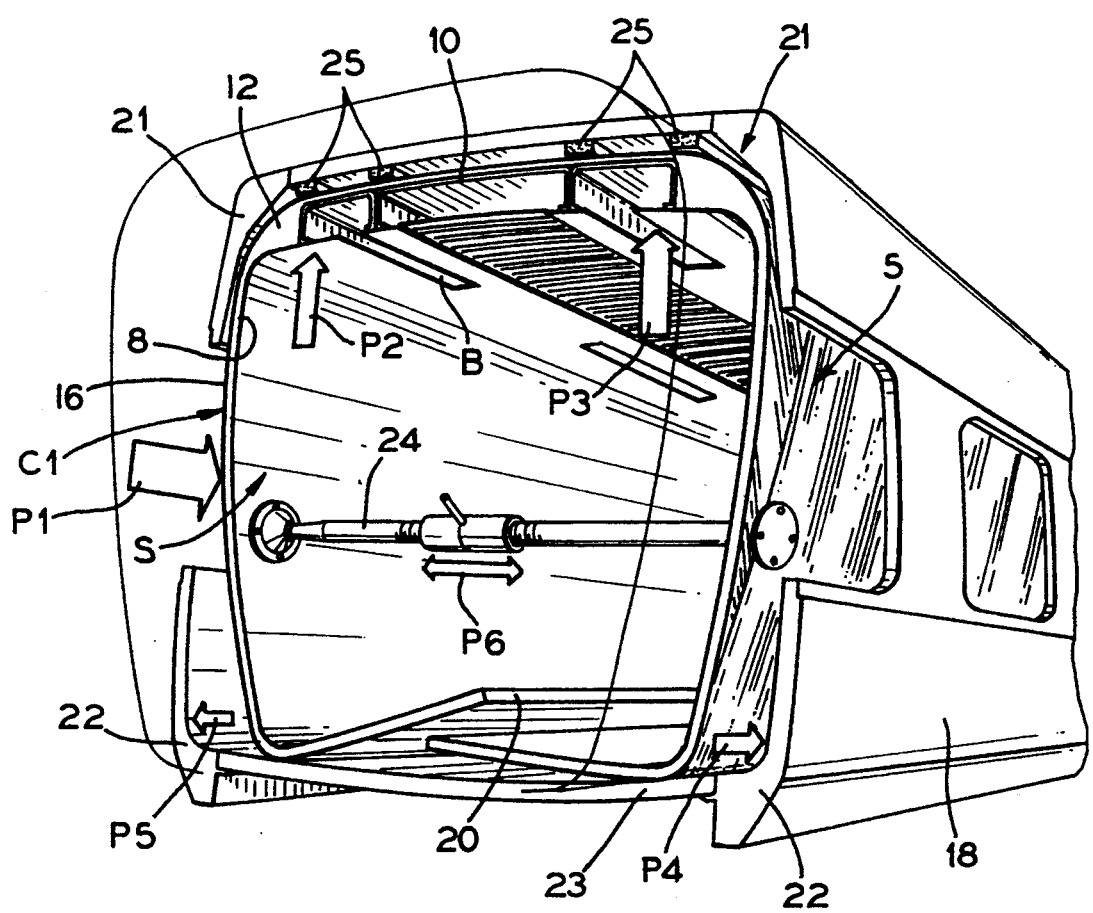
FIG. 3 is a fragmentary perspective view showing an internal structure being inserted into an outer structure in accordance with the method of the present invention.

In the FIG. 3, a plurality of arrows P1, P2, P3, P4 and P5 symbolize the installation of the internal structure C1 into the outer structure 18 to form a partial coach body C2 as shown in the FIG. 4. The outer structure 18 has the same general cross-sectional shape as the internal structure C1 and includes a stiffening framework 21, a pair of lower corner structures 22 and a base plate 23 forming a tubular structure open at both ends. After the insertion of the elastically deformed internal structure C1 into an open end of the outer structure 18 in a seventh step as indicated by the arrow P1, the internal structure C1 is moved upwardly in a direction indicated by the arrows P2 and P3 and sidewardly in opposite directions indicated by the arrows P4 and P5. The movement of the walls is achieved by a tensioning device 24 having opposite ends engaging the opposed side walls S. The tensioning device expands to move its opposite ends apart as indicated by a double headed arrow P6. A plurality of longitudinally extending, elastically deformable bands 25, which are positioned between an outer surface of the ceiling wall 9 of the internal structure C1 and an inner surface of a ceiling wall of the outer structure 18 are deformed elastically whereby these bands 25 act as spring elements. In a further assembly step, the internal structure C1 is provisionally attached to the stiffening framework 21 of the outer structure 18 utilizing a plurality of fasteners (not shown) inserted through the apertures 19 and engaging the outer structure 18. As best shown in the FIGS. 4 and 5, the internal structure C1 and the framework 23 are also attached by a plurality of fasteners 26 which extend through apertures formed in the base plate 23 and threadably engage the metal rails 14 in the floor wall 13 to complete an eighth step.

Finally, a separating gap 27 (FIG. 3), which was formed by the longitudinal cut 20, is filled in with a suitable material. The seating (not shown) is fastened to the metal rails 14 and to the side walls at the apertures 19. A rubber washer or isolator 28 is arranged between a head of the fastener 26 and a facing surface of the base plate 23. A layer of insulating material 29 is arranged between the outer covering layer 16 and the base plate 23.

Figure 6:
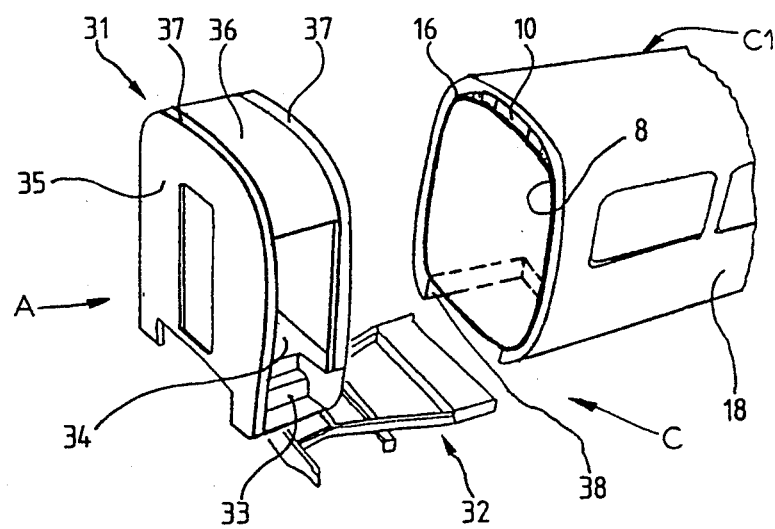
FIG. 6 is an exploded fragmentary perspective view of a coach body formed in accordance with the method according to the present invention.
Figure 7:
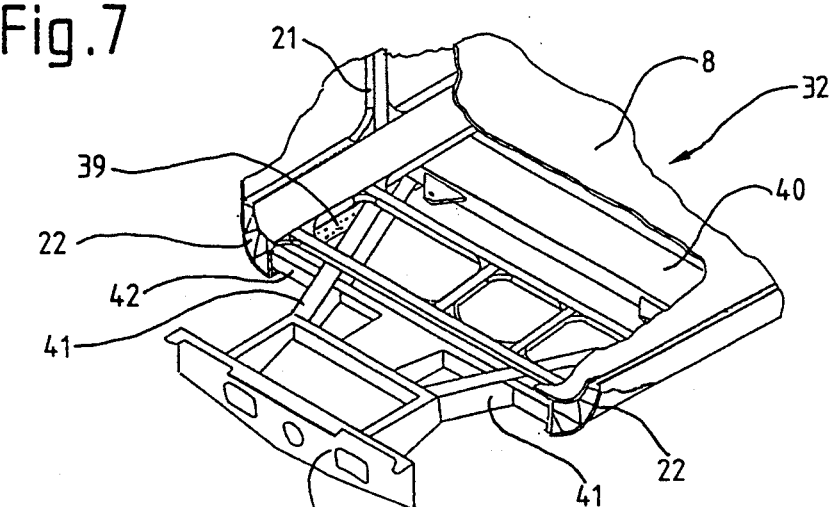
FIG. 7 is an enlarged fragmentary view of the coach body shown in the FIG. 6.

As shown in the FIGS. 6 and 7, a railway coach body C is completed by attaching a termination assembly A, which assembly is formed by a boarding module 31 and a support module 32, at each open end of the partial coach body C2. The boarding module 31 includes of a set of boarding stairs 33, a generally horizontally extending floor plate 34 attached to an upper end of the stairs 33, an end wall 35, a roof shell 36 and a pair of spars 37. One of the spars 37 connects the end wall 35 to the stairs 33 and the roof shell 36. The other one of the spars 37 connects the stairs 33 and the roof shell 36 to the partial coach body C2. The boarding module rests on the support module 32 and is connected to the body C2 by fasteners as shown in the FIG. 9.

The support module 32 engages a cut-out portion 38 of the outer structure 18 and is attached by a connecting flange 39 to each of the corner structures 22. A stool carrier 40 is attached to a not illustrated rotary frame on which the railway truck is mounted. The support module 32 also includes diagonal carriers 41 attached to the connecting flanges 39 and the stool carrier 40, a transverse carrier 42 attached to the diagonal carriers 41 and the corner structures 22 and a head member 43 attached to the diagonal carriers 41.

Figure 8:
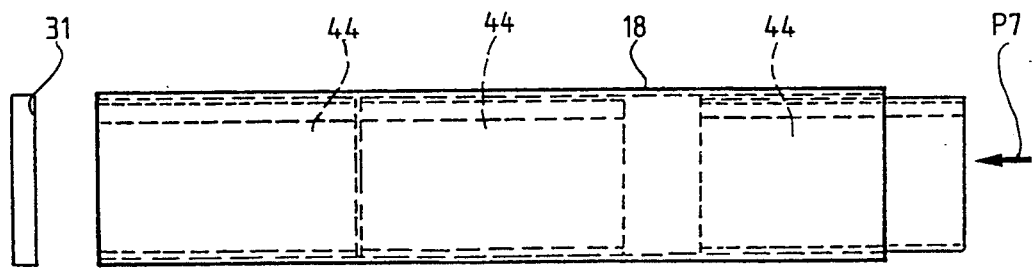
FIG. 8 is an exploded side elevation view of an alternate embodiment of the coach body shown in the FIG. 6.

An alternative embodiment for the installation of the internal structure C1 into the outer structure 18 is illustrated in the FIG. 8. In that case, the internal structure C1 is divided transversely into several portions 44 and each of these portions are pushed into the outer structure 18 in a direction indicated by an arrow P7. Problems of tolerance and assembly between the internal structure C1 and the outer structure 18 can be countered by this variant of assembly.

Figure 9:
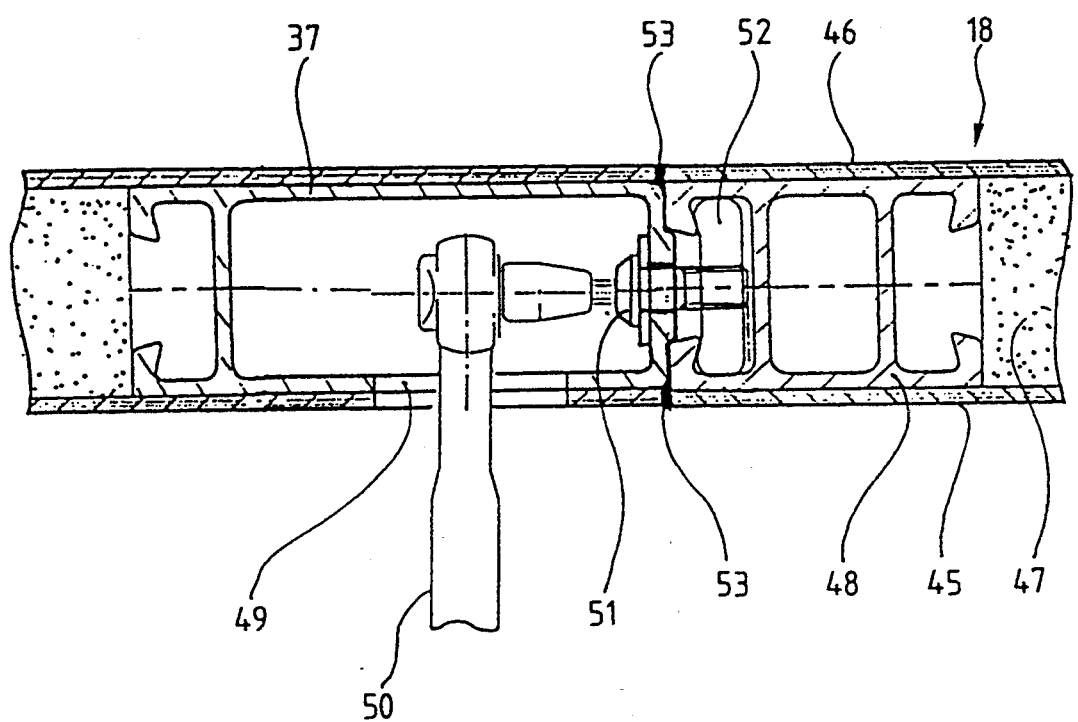
FIG. 9 is an enlarged fragmentary cross-sectional view showing the attachment of the boarding module to the outer structure in accordance with the method of the present invention.

As stated above, the boarding module 31 is attached to the outer structure 18 as illustrated in the FIG. 9. The outer structure 18 is formed by an internal winding layer 45 spaced from an external winding layer 46 with insulation material 47 interposed therebetween. Positioned at an edge of the insulation 47 is a rim structure 48. The spar 37 of the boarding module 31 has a hollow profile which is connected to an opening 49 formed in the internal winding layer 45 and the wall of the spar 37. The opening 49 can be closed by a removable dummy plug (not shown). A screwdriver blade 50 can be inserted through the opening 49 for rotating a threaded fastener 51 into a clamping member 52 positioned at the end face of the rim structure 48. A putty joint 53 seals the abutting surfaces between the spar 37 and the rim structure 48. The screw attachment technique illustrated in the FIG. 9 is also used for connecting adjoining coach body portions 44 together.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A method for the manufacture of coach bodies comprising the steps of:
    a. winding an inner covering layer on a winding core to form an internal structure, the winding core having a desired size and shape of a coach body, the inner covering layer having a generally rectangular cross section with a ceiling wall, a floor wall and a pair of spaced apart side walls connected by four curved corner regions;
    b. attaching at least one channel segment to an outer surface of the ceiling wall, attaching insulation segments to outer surfaces of the corner regions, attaching heating fabric sheets to outer surfaces of the floor wall and the side walls for heating the floor wall and the side walls, and attaching a plurality of spaced apart longitudinally extending metal rails to outer surfaces of the floor wall and the side walls;
    c. filling the spaces between the metal rails with insulating foam;
    d. winding an outer covering layer about the internal structure;
    e. removing the internal structure from the winding core;
    f. forming apertures in the ceiling wall and the side walls and cutting the floor wall open longitudinally;
    g. elastically deforming the internal structure to compress the internal structure and inserting the compressed internal structure into an outer structure; and
    h. moving the floor wall, the side walls and the ceiling wall of the internal structure outwardly into engagement with the outer structure and attaching the internal structure to the outer structure to form a partial coach body.

2. The method according to claim 1 wherein the step h. includes engaging the side walls with opposite ends of a tensioning device and expanding the tensioning device.

3. The method according to claim 1 including inserting a plurality of longitudinally extending elastic bands between the ceiling wall of the internal structure and the outer structure before performing the step h.

4. The method according to claim 1 wherein the internal structure is attached to the outer structure by fasteners extending through a base plate of the outer structure and engaging the metal rails attached to the floor wall of the internal structure.

5. The method according to claim 1 wherein the internal structure is formed as a plurality of portions which are inserted one after the other into the outer structure and attached thereto.

6. The method according to claim 1 wherein a plurality of window openings are formed in the internal structure.

7. The method according to claim 6 wherein the window openings are formed after the step h. is performed.

8. The method according to claim 1 including forming a cut-out portion in the outer structure and attaching a termination assembly at an open end of the partial coach body, the termination assembly including a boarding module and a support module, the support module being inserted into the cut-out portion.

9. The method according to claim 1 wherein the steps a. and d. are performed by winding a resin-impregnated fiber strand in a spiral pattern in two or more mutually crossing alternating direction layers for each of the covering layers.

10. The method according to claim 9 wherein the fiber strand is formed of a plurality of one of glass fibers, carbon fibers and natural fibers.

11. A method for the manufacture of coach bodies comprising the steps of:
    a. winding an inner covering layer on a winding core to form an internal structure, the winding core having a desired size and shape of a coach body, the inner covering layer having a generally rectangular cross section with a ceiling wall, a floor wall and a pair of spaced apart side walls connected by four curved corner regions;
    b. attaching at least one channel segment to an outer surface of the ceiling wall, attaching insulation segments to outer surfaces of the corner regions, attaching heating fabric sheets to outer surfaces of the floor wall and the side walls for heating the floor wall and the side walls and attaching a plurality of spaced apart longitudinally extending metal rails to outer surfaces of the floor wall and the side walls;
    c. filling the spaces between the metal rails with insulating foam:
    d. winding an outer covering layer about the internal structure;

e. removing the internal structure from the winding core;
f. forming apertures in the ceiling wall and the side walls and cutting the floor wall of the internal structure open longitudinally;
g. elastically deforming the internal structure to compress the internal structure and inserting the compressed internal structure into an outer structure;
h. inserting a plurality of longitudinally extending elastic bands between the ceiling wall and the outer structure;
i. moving the floor wall, the side walls and the ceiling wall outwardly into engagement with the outer structure and attaching the internal structure to the outer structure to form a partial coach body; and
j. forming a plurality of window openings in the internal structure.

12. The method according to claim 11 including forming a cut-out portion in the outer structure and attaching a termination assembly at an open end of the partial coach body, the termination assembly including a boarding module and a support module, the support module being inserted into the cut-out portion.

* * * * *